United States Patent
Tokura

[15] 3,696,930
[45] Oct. 10, 1972

[54] HORIZONTAL COMPRESSION TYPE AUTOMATIC FILTER PRESS

[72] Inventor: Tadao Tokura, Handa City, Japan

[73] Assignee: NGK Insulators, Ltd., Nagoya City, Japan

[22] Filed: Dec. 9, 1970

[21] Appl. No.: 96,545

[30] Foreign Application Priority Data

April 4, 1970 Japan .....................45/28271

[52] U.S. Cl. ...............................................210/225
[51] Int. Cl. ............................................B01d 25/32
[58] Field of Search.....................................100/198; 210/224–231

[56] References Cited

UNITED STATES PATENTS

| | | | |
|---|---|---|---|
| 1,404,490 | 1/1922 | Stevenson | 100/198 X |
| 3,098,429 | 7/1963 | Hagglunn | 210/226 |
| 3,121,681 | 2/1964 | Baxter | 210/104 |
| 3,153,630 | 10/1964 | Green | 210/230 |
| 3,561,600 | 2/1971 | Kunta | 210/225 |

FOREIGN PATENTS OR APPLICATIONS

| | | | |
|---|---|---|---|
| 500,069 | 12/1950 | Belgium | 210/224 |
| 447,551 | 1/1913 | France | 210/226 |

*Primary Examiner*—Reuben Friedman
*Assistant Examiner*—T. A. Granger
*Attorney*—George F. Dvorak, Stephen T. Skrydlak and Marden S. Gordon

[57] ABSTRACT

A horizontal compression type automatic filter press for filtering and squeezing slurry through an endless filter cloth, comprises filter plate open and close means for opening and closing all of filter plates simultaneously, diaphragms each having a main portion, which is secured to a movable filter plate, being thicker than the periphery of the diaphragm secured to a stationary filter plate, double surface filter plates each providing a filtration resistance difference between opposite surfaces thereof, filter cloth transfer means having two sets of rollers arranged one above the other, the diameter of the one set of rollers above arranged being smaller than that of the other set of rollers. The filter press according to the invention accomplishes minimization of water content of filter cakes obtained by the press and remarkably high average filtering rates and achieves full automatic operation and shortening of the overall length of the press.

8 Claims, 10 Drawing Figures

3,696,930

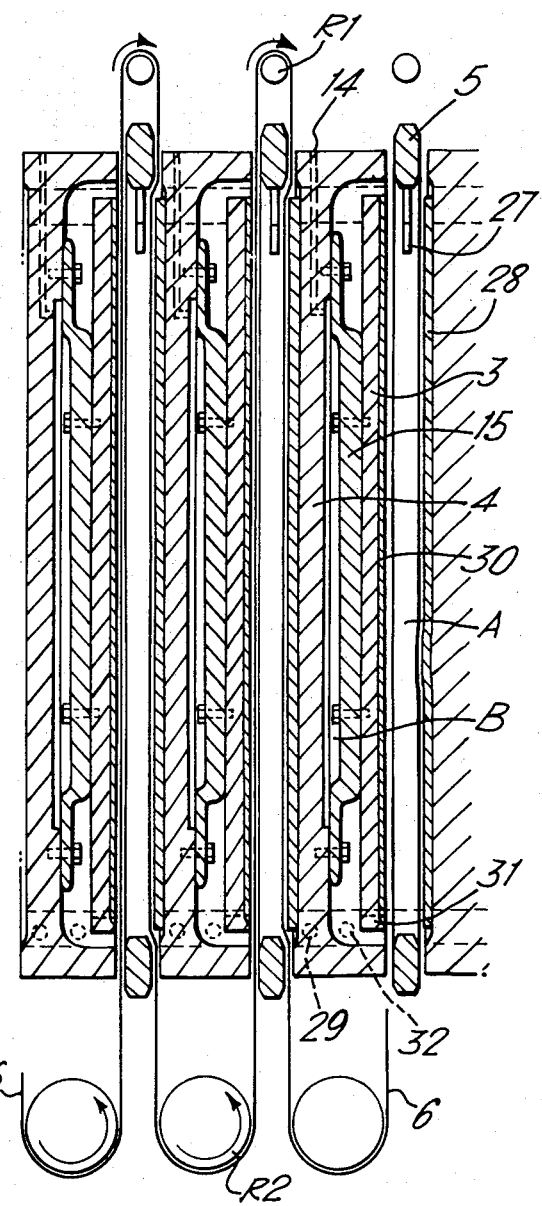
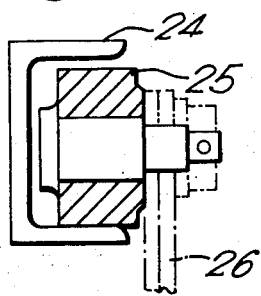

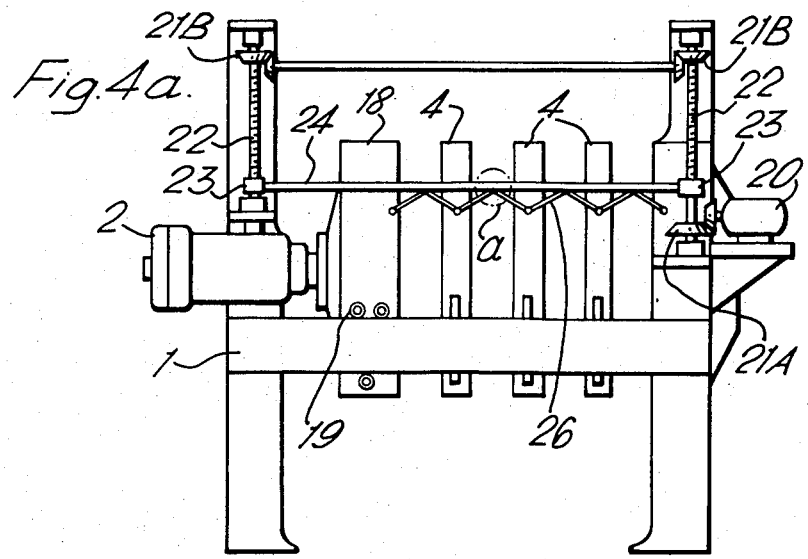
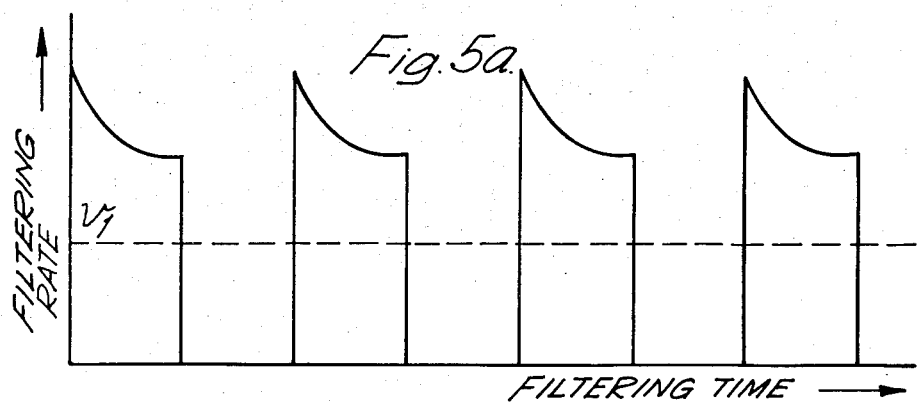
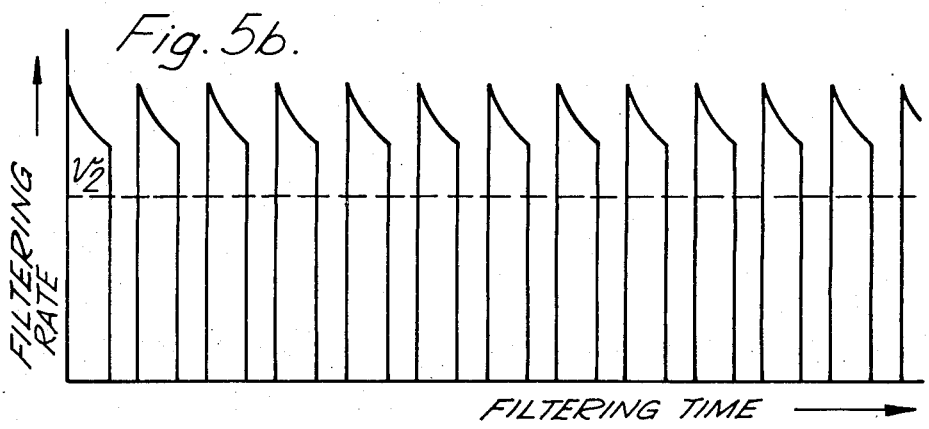

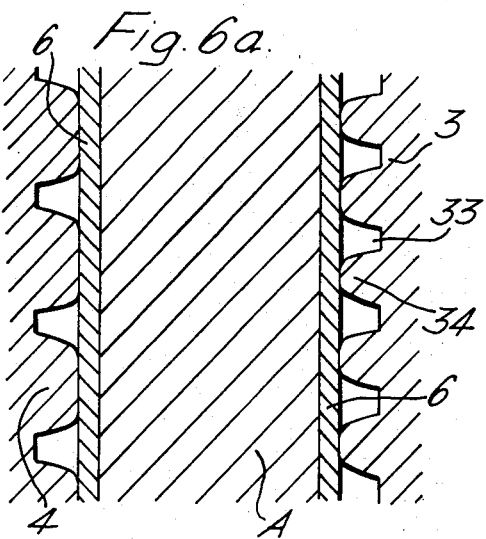
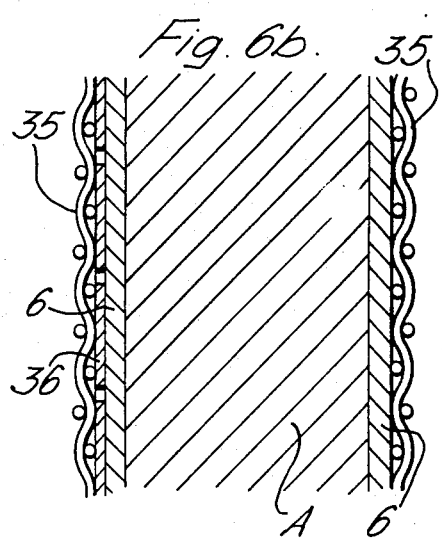
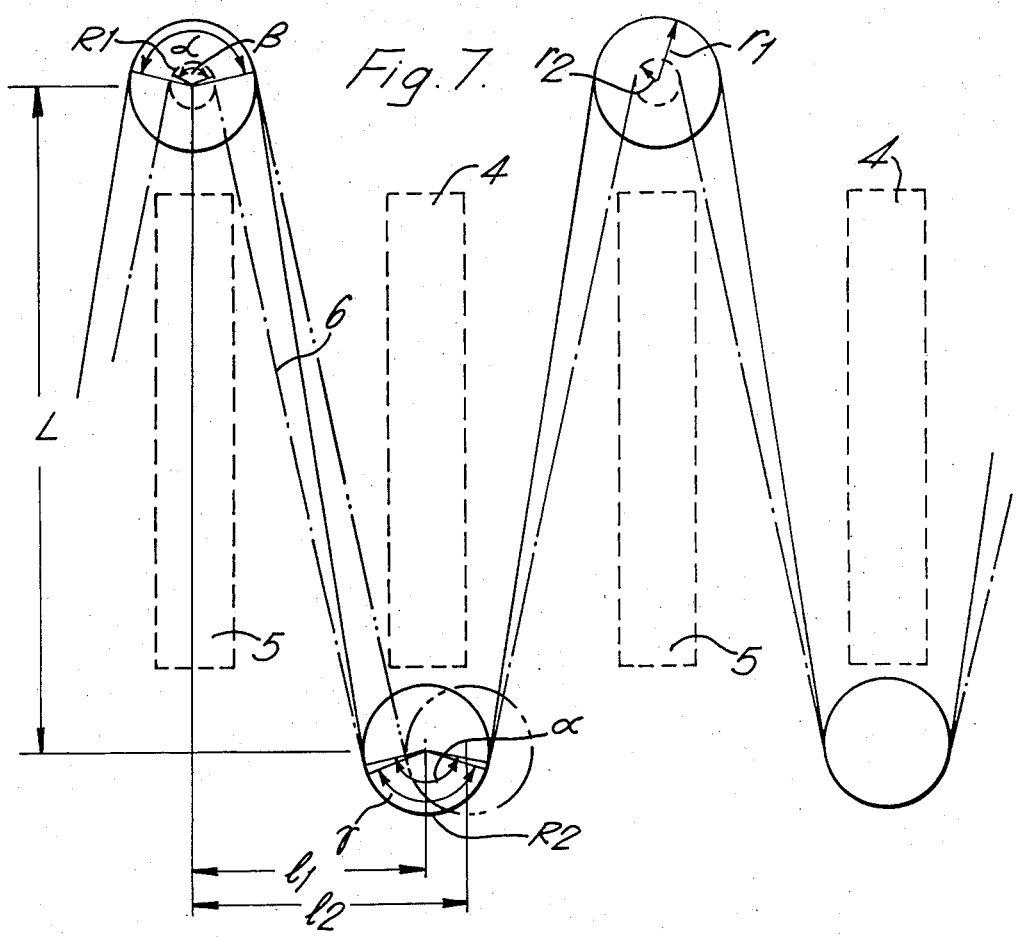

:::page 1
HORIZONTAL COMPRESSION TYPE AUTOMATIC FILTER PRESS

BACKGROUND OF THE INVENTION

1. Field of the Invention

The present invention relates to a horizontal compression type automatic filter press for compression filtering and squeeze dewatering slurry through an endless filter cloth, and more particularly to filter plate open and close means for opening and closing all of filter plates simultaneously in order to shorten waste time from a termination of one filtering operation and to a commencement of next filtering operation to perform more effective filtration, a diaphragm for filter plates arranged between a filter chamber and a pressure fluid chamber, a filter plate having construction adapted to retain a cake on a portion of the filter cloth on one side of the filter chamber when the filter plates are opened to dislodge the cake accumulated in the filter chamber, and filter cloth transfer means having less travelling resistance of the filter cloth.

2. Description of the Prior Art

In filter presses hitherto used, water contents of filter cakes could not be lowered to a valve less than a certain limitation, so that in order to obtain cakes having much less water content the cakes must again be squeezed in separate process, or be subjected to drying process and the like for more dewatering. To eliminate such an extra process, vertical compression type automatic filter presses performing continuous dewatering and squeezing in single apparatus have been suggested. In this type, however, after filter plates have been opened, upon lateral movement of filter cakes, a filter cloth is likely to be broken owing to the weight of cakes acting upon the cloth and undue powers are required for the movements of the cloth. Horizontal type filter presses having endless filter cloths have been suggested, which are provided with cake discharging means by which cakes are moved from filter frames taken out from the press after one filtering operation. With such a construction, however, there are disadvantages that it requires much time for the movements of the filter frames, thus increasing waste time and decreasing its filtration faculty and that it may be expensive for the discharging means and transfer means for the filter frames.

In filter plate open and close mechanisms of filter presses hitherto used, there have been three types, that is (1) movable block type wherein movable blocks driven by chains are provided with pawls adapted to be raised by a cam mechanism, by means of which lugs on opposite outer sides of filter plates are urged to open or close the filter plates, (2) link type wherein links movable within determined distances are provided on opposite outer sides of filter plates, the links serving to move the filter plates in synchronism with links on a movable pedestal, and (3) chain type wherein the same operation as in the above link type is carried out by chains.

In any of these prior filter plate open and close mechanisms, filter plates are opened or closed one by one so that it requires considerable period of time. Accordingly, it is desired to improve its filtration efficiency by shortening the filtering time by the use of thin cake layers and to improve an average filtering rate by the continuous operation of the filter press resulting from the minimum waste time by virtue of a repetition of the short period cycle.

Moreover, diaphragms for filter plates used in compression type filter presses hitherto used are usually elastic membranes made of rubber and the like having a uniform thickness, of which mounting to a stationary filter plate is effected at the periphery by means of clamp bolts tightening the diaphragm and the plate with washers.

In such a diaphragm having uniform thickness, however, owing to the same thickness of the main portion as that of the periphery of the diaphragm, a dimension of the interior of a chamber of the stationary filter plate enclosing a movable filter plate and the diaphragm could not be made larger than a valve approximate to the total thickness of the movable plate and the main portion of the diaphragm so that a distance of a movement of the movable filter plate caused by fluid under pressure forced in the pressure fluid chamber is naturally limited, thus adversely affecting the high pressure squeeze in the filtering chamber and further the mounting of the diaphragm is complicated and troublesome.

Moreover, in double surface filtration using an endless filter cloth, it is required to retain a cake attached to the portion of a filter cloth on either one determined side in order to facilitate removing the cake after a filtration has been completed. There have been no filter presses enabling this problem to be solved.

Furthermore, in a horizontal type filter press having an endless filter cloth hitherto used, rollers arranged alternately above and below filter frames and filter plates have the same diameter. With such a construction, travelling resistances of the cloth may unduely increase, causing an inconvenience in operation.

SUMMARY OF THE INVENTION

A primary object of the invention is, therefore, to provide a horizontal compression type automatic filter press which eliminates manual operation to facilitate its operation and can obtain filter cakes having considerably low water contents.

A further object of the invention is to provide a filter press provided with novel simultaneous filter plate open and close means to improve its average filtering rates to much higher values.

An another object of the invention is to provide a filter press provided with diaphragms of which main portions are thicker than peripheries, thereby obtaining filter cakes having low water contents.

A further object of the invention is to provide a filter press provided with filter plates adapted to retain cakes on determined sides of a cloth, thereby preventing the cakes from being carried along between the cloth and rollers.

A still further object of the invention is to provide a filter press adapted to mitigate travelling resistances of a filter cloth without increasing the overall length of the press.

BRIEF DESCRIPTION OF THE DRAWING

The foregoing objects and other objects as well as the characteristic features of the invention will become more apparent and more readily understandable by the following description and the appended claims when read in conjunction with the accompanying drawings, in which:

FIG. 3 is a detailed sectional view of a part of the filter plate assembly of the filter press shown in FIG. 1;

FIG. 4a is a diagrammatical explanatory view of an embodiment of filter plate open and close means of the filter press according to the invention;

FIG. 4b is a detailed partial sectional view of the portion encircled in line a in FIG. 4a;

FIG. 5a is a graph showing a relation between filtering time and rate in prior art;

FIG. 5b is a graph showing relation between filtering time and rate improving an average filtering rate according to the invention;

FIG. 6a is a partial sectional view of one embodiment of a filter plate according to the invention;

FIG. 6b is a partial sectional view of another embodiment of the filter plate; and FIG. 7 is a schematic illustration of endless filter cloth transfer means according to the invention.

DESCRIPTION OF THE PREFERRED EMBODIMENTS

Figure 1:
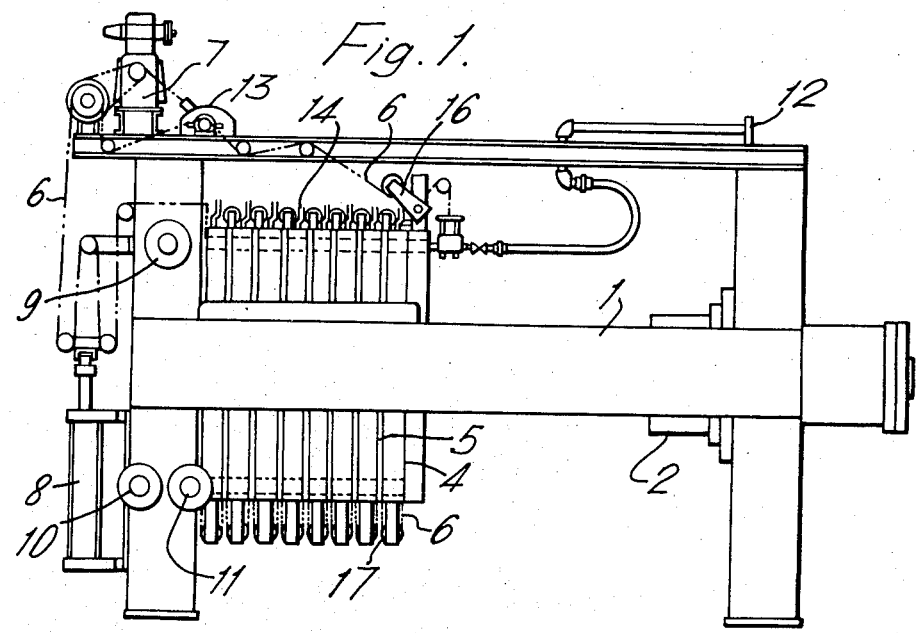
FIG. 1 is an elevational view of an embodiment of a filter press in a closed position during filtering and squeezing operations according to the invention.

Referring to FIGS. 1 and 3, the filter press according to the invention includes a frame having a side bar 1 on which are mounted movable filter plates 3 adapted to be clamped by means of a cylinder 2 for clamping the filter plates and stationary filter plates 4 enclosing respective diaphragms 15, between which plates 4 filter frames 5 are arranged. An endless filter cloth 6 extends around two sets of transfer rollers $R_1$ and $R_2$, these sets of rollers having a different diameters and arranged in upper and lower portions of the press frame in opposition to each other as shown in FIG. 3. The filter press further comprises a filter cloth drive means 7 with a serpentine movement preventing unit 13 for the filter cloth mounted on a top frame of the press as shown in FIG. 1, a filter cloth tension unit 8 at the lower end of the press on the same side as the drive means 7, a cloth cleaning unit 16 at a location where the endless cloth leaves the most end filter plate 4, and scraper plates 17 for scraping filter cakes each at an appropriate location where the cloth 6 is about to ride on the larger diameter roller $R_2$ (FIGS. 2 and 3).

The automatic filter press according to the invention furthermore comprises a slurry inlet 9, a filtrate outlet 10, a feed blow inlet 11, a back blow inlet 12 and pressure fluid inlet 14.

The operation of the automatic filter press according to the invention will be explained hereinafter. As shown in FIGS. 1 and 2, the slurry introduced under pressure through the inlet 9 by means of a pump is compressed to a determined pressure to filter it through the filter cloth 6, after which a valve at the inlet 9 is closed and then water under pressure or compressed air is supplied through the pressure fluid inlet 14 to urge the diaphragms 15 against the respective movable filter plates to effect a squeezing operation for a determined period of time. After the squeeze has been completed, air under pressure is supplied through the back blow inlet 12 to purge the slurry remaining in the pipings such as the inlet 9 and the like and further air under pressure is supplied through the feed blow inlet 11 to dewater the filter cakes.

Figure 2:
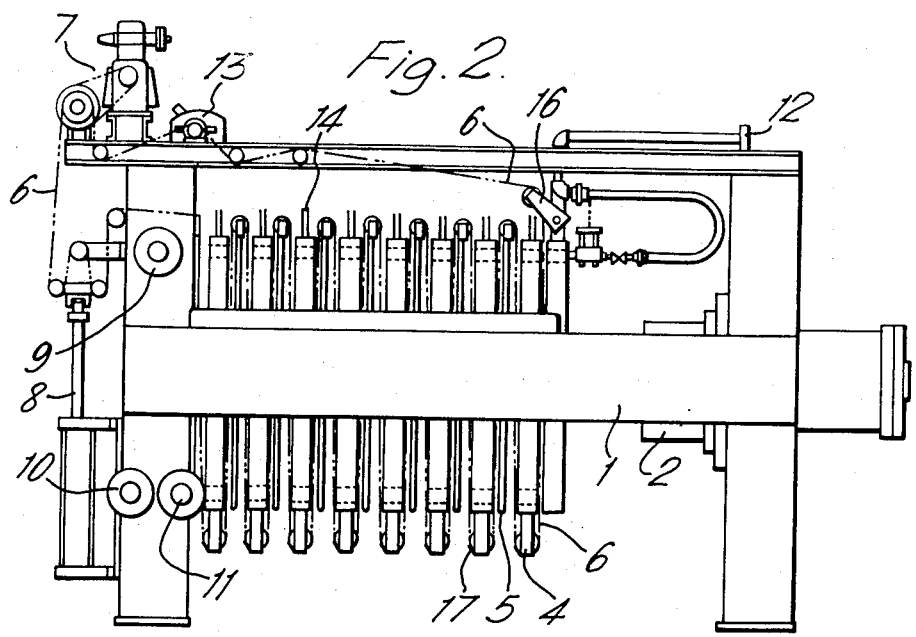
FIG. 2 is an elevational view of the filter press in FIG. 1, but shown in an opened position.

The cylinder 2 for clamping the filter plates are then released to open the plates as shown in FIG. 2. At this time, the opening of the stationary filter plates 4 are effected by means of simultaneous filter plate open and close means according to the invention which will be later explained in detail. When the stationary filter plates 4 are brought from a closed position as shown in FIG. 3 into an opened position, the filter cloth 6 trained around the transfer rollers $R_1$ and $R_2$ having the different diameters are inclined to relatively large angles, permitting the cakes to fall by gravity, which have attached to that portions of the cloth advancing to the larger diameter rollers $R_2$, that is, the portions of the cloth on the left side of the respective stationary filter plates 4 as viewed in FIG. 3. If the filter cloth is driven while the filter plates are in the opened position, the scraper plates 17 shown in FIG. 2 serves to effect more full falls of the cakes by gravity so that they are completely removed from the cloth. The travelling cloth is cleaned by the cloth cleaning unit 16.

Referring to FIG. 4a, filter plate open and close means according to the invention for use in a filter press having the hydraulic cylinder 2 for reciprocative movements of a loose head 18 supported on the side bar 1 by rollers 19, comprises a motor 20 operative in synchronism with the extension and retraction of the hydraulic cylinder 2, feed screw shafts 22 arranged along a frame of the press and rotated through bevel gears 21A and 21B by the drive motor 20, and a link rail such for example as a channel shaped rail 24 as shown in FIG. 4b each end of which is secured to a nut 23 threadedly fitted with the feed screw shaft 22, on which link rail 24 are provided a plurality of rollers 25, each having a central shaft to which are pivotted two links 26, the opposite ends of which are pivotted to the loose head 18 and the filter plate 4, respectively, to form a serpentine link as a whole as shown in FIG. 4.

With such a construction of the filter plate open and close means, inasmuch as the bevel gears 21A and 21B have the same gear ratio, the feed screw shafts 22 are rotated at the same speed to move the link rail 24 in its horizontal state, thereby causing the serpentine link 26 pivotally supported on the link rail 24 by the rollers 25 to extend or contract with the vertical movement of the link rail 24 so that all of the filter plates are opened or closed simultaneously.

The effects of the filter plate open and close means according to the invention are clearly evident as shown in FIGS. 5a and 5b. In the prior art as shown in FIG. 5a, filtering operations are intermittent owing to long waste time which is indirect time such as for opening and closing the filter plates except the time for filtering, and the average filtering rate $v_1$ as shown in broken line in FIG. 5a is much lower than that $v_2$ of the present invention as shown in FIG. 5b wherein the waste time has been shortened.

The operation of the filter press installing filter frames 5 through the filter cloth 6 between the stationary filter plates 4 each enclosing the movable filter plate 3 and a diaphragm according to the invention will be described with reference to FIG. 3. The slurry forced under pressure through slurry inlets 27 in the filter frames 5 is filtered through the filter cloth 6, the filtrate being exhausted from filtrate outlets 29 through filtrate collecting grooves 28 formed in the stationary filter plates 4, and the filtrate filtered through the opposite portion of the cloth being exhausted from drain holes 32 in the stationary filter plates through filtrate collecting grooves 30 formed in the movable filter plates 3 and collecting holes 31 of the movable filter plates 3. Cakes remain in filter chambers A in the respective filter frames 5.

High pressure fluid is then forced into each pressure fluid chamber B through a pressure fluid inlet 14 provided in each stationary filter plate 4 and communicating with the fluid chamber B, causing each diaphragm 15 with the movable filter plate 3 to urge the cake in the filter chamber A to an extend corresponding to the thickness of the diaphragm 15, and thereby each cake is further compressed to a lower water content. For that purpose, according to the invention the diaphragm is made thicker at its main portion than at is periphery, which makes it easy to mount the diaphragm on the plate 4 and makes the stroke of the movable plate longer, thereby making it possible to obtain cakes of lower water content than those in hitherto used filter presses.

In the present invention, a filter cake is retained attached to the portion of a filter cloth on the determined side of the same. In various investigations, it has been found that if there is any difference in filtration resistance between opposite sides of a filter cloth, a cake attaches without fail to the side where filtration resistance is larger than that of the other side. In a preferred embodiment of the invention, the width of the filtrate collecting grooves in the form of rugged shapes formed in a filter plate is purposely varied to cause a difference in filtration resistance, or wires are arranged between a filter plate and one of portions of the filter cloth forming one wall of a filter chamber and between a filter plate and the other of the portions of the cloth and a filter plate forming the other wall of the chamber, and further a perforated plate is interposed between the wire and the portion of the cloth on either side of the filter chamber.

In the embodiment employing different width filtrate collecting grooves in the form of rugged shape formed in the filter plates, a filter plate 3 adjacent to a filter cloth 6 arranged in a filter frame forming a filter chamber A is formed in its one surface with recesses 33 serving as collecting grooves for filtrate and with protrusions 34 serving to retain a cake in close contact with the cloth 6 enclosing the cake as shown in FIG. 6a. As the cloth 6 is brought into close contact with the protrusions 34 of the filter plate 3, the filtration resistance of that portions of the cloth becomes larger. On the other hand, recesses and protrusions in the filter plate 4 in opposition to the plate 3 are much fewer than those in the plate 3 so that areas having higher filtration resistance on the side of the plate 4 are wider than those on the side of the plate 3. On opening the filter plates, the cake becomes out of contact with the cloth on the side of the plate 3 and is retained attached to the cloth on the side of the plate 4 having a higher filtration resistance as a whole.

In the embodiment employing a perforated plate, as shown in FIG. 6b, wires are arranged in contact with the filter plates on opposite sides and further on one side between the wire 35 and the filter cloth is interposed a perforated plate 36, the area of perforations of which has previously been adjusted, thereby causing a difference in filtration resistance between the portions of the cloth on opposite sides and retaining the cake attached to the portion of the cloth on the side of the plate having the perforated plate.

In horizontal filter presses having endless filter cloths of the prior art, rollers for extending the cloth thereon, which are alternately arranged above and below filter frames and filter plates, have the same diameter.

Referring to FIG. 7, filter plates and frames are shown in broken lines, rollers in circles and a filter cloth in straight lines between the rollers. Solid lines show a system of a prior filter press, dot-dash lines the diagrammatic arrangement of a filter cloth according to the invention, and double dotted-dash lines the diagrammatic filter cloth bringing about the same effect as in the present invention.

In FIG. 7, a contact length of a filter cloth with a roller is $r_1 \alpha$, to which a travelling resistance is proportional, where $\alpha$(radian) is a contact angle of the filter with the roller and $r_1$ is the radius of the roller. If the upper roller having the radius $r_1$ is modified to a roller $R_1$ having a smaller radius $r_2$, a contact angle $\alpha$ at a larger diameter roller $R_2$ decreases to a smaller angle $\gamma$ and also the contact angle $\alpha$ at the smaller diameter roller $R_1$ decreases to a smaller angle $\beta$. The rollers $R_1$ and $R_2$ are alternately arranged above and below the filter frames and plates in a spaced relation by a distance L. In the case of a hitherto used filter press wherein all of rollers arranged on upper and lower portions of the press have the same diameter, a travelling resistance of a filter cloth is represented by $2\mu r_1 \alpha$, where $\mu$ is resistance coefficient, whereas in the case of employing rollers, one set of which rollers have the smaller radius $r_2$, a travelling resistance is represented by $\mu(r_1 \gamma + r_2 \beta)$. In comparison of the values of the resistances, $\mu(r_1 \gamma + r_2 \beta)$ is less than $2\mu r_1 \alpha$ as can be seen from the above description and FIG. 7. On the other hand, if a contact angle will be made smaller without changing a roller diameter, a pitch between rollers adjacent to each other one above the other must be enlarged from $l_1$ to $l_2$ as shown in FIG. 7. As a result, a pitch between a filter frame and a filter plate as they are opened is also enlarged, so that the overall length of the filter press is naturally lengthened, causing the cost of equipment to increase and giving rise to inconvenience in operation.

To avoid this, in a filter press having a filter cloth extending between filter frames and filter plates as shown in FIG. 3, the diameter of the rollers $R_1$ arranged above the filter frames 5 is made smaller than that of the rollers $R_2$ arranged below the filter plates 4 and the endless filter cloth is driven by means of cloth drive means provided at a suitable position on the filter press frame. In the filter press with such an arrangement, when the filter plates are in opened position on the termination of a compression filtering and a squeeze process, the filter cloth 6 extending between the rollers $R_1$ and $R_2$ arranged above the filter frames 5 and below the filter plates 4 is inclined to a greater extent (FIG. 7) than in prior art, permitting cakes attached to the cloth to more effectively fall by gravity and thereby making the travelling resistance smaller than in the case of rollers having the same diameter.

The filtration capacity of the filter press according to the invention is of the order of 20 kgDS/m²/hr which is remarkably greater than that in hitherto used filter presses such as 2.5 kgDS/m²/hr.

Moreover, the water content of the cake obtained by the filter press according to the invention is of the order of 40 percent, which faculty is a significant advantage since hitherto used filter presses could never obtain cakes of less then 60 percent water content.

As above described, the filter press according to the invention accomplishes the dewatering of cake to the considerably much lower water content, the full automatic operation, the shortening of overall length of the press, the higher average filtering rate and the minimized travelling resistance of the filter cloth.

While several examples have been herein disclosed, it is obvious that various changes can be made without departing from the spirit and scope of the invention as set forth in the appended claims. Further, it is to be understood that all matter hereinbefore set forth is to be interpreted as illustrative and not in a limiting sense.

What is claimed is:

1. A filter press for compression filtering and squeeze dewatering slurry through an endless filter cloth, comprising:

a plurality of transversely extending longitudinally spaced stationary filter plates;

a plurality of transversely extending longitudinally spaced movable filter plates, each movable filter plate being alternately positioned between adjacent stationary filter plates;

a plurality of diaphragms each having a main portion which is thicker in cross-section than its outer peripheral portions, each diaphragm having its central portion connected to an associated movable filter and its outer peripheral portion connected to an associated stationary filter plate so that the diaphragm is sandwiched therebetween;

the stationary filter plates each having a cavity formed therein for enclosing the diaphragm and movable filter plate, connected therewith;

a plurality of longitudinally spaced filter frames supported on a side bar of the filter press, each frame being disposed between adjacent faces of adjacent stationary and movable filter plates so as to form a filter chamber therebetween;

filter cloth disposed between the opposed sides of each filter frame and the adjacent faces of the adjacent stationary and movable filter plates;

means for pressing the diaphragm and its attached movable filter plate toward the face of the adjacent stationary filter plate to compress therebetween within the interposed filter frame between the filter cloth the slurry introduced into the filter chamber in the filter frame;

the faces of the movable and stationary filterplates being in contact with the opposed sides of the filter frame through the filter cloth in a manner to provide a difference in filtration resistance between the faces of the adjacent movable and stationary filter plates so that upon completion of the compressing action and the opening of the filter plates the cake of compressed slurry remaining is attached only to the portion of the filter cloth located on the side of the high filtration resistance thereby facilitating the removing of the cake from the cloth and dropping it out of the filter chamber upon the opening of the filter press;

filter plate open and close means for opening and closing all of filter plates and filter frames simultaneously; and filter cloth transfer means for shifting the filter cloth, including transfer rollers consisting of a first set of rollers arranged above and a second set of rollers arranged below the filter plates and filter frames the diameter of the first set of rollers being smaller than that of the second set of rollers.

2. A filter plate for a filter press according to claim 1, wherein said difference in filtration resistance is obtained by difference in areas of collecting grooves forming filtrate paths through which the filtrate flows and which are formed in the opposed surface faces of said movable and stationary filter plates having interposed therebetween the filter cloth and filter frame.

3. A filter plate for a filter press according to claim 1, wherein said difference in filtration resistance is obtained by providing a perforated plate between the surface face of the movable filter plate and the adjacent filter cloth.

4. A filter plate for a filter press according to claim 1, wherein said difference in filtration resistance is obtained by providing a perforated plate between the surface face of the stationary filter plate and the adjacent filter cloth.

5. A filter press for compression filtering and squeeze dewatering slurry through an endless filter cloth, comprising simultaneous filter plate open and close means including a drive motor operative in synchronism with the reciprocative speed of a hydraulic cylinder causing reciprocative movements of a loose head, and a plurality of rollers on a link rail secured to feed screw shafts driven by said drive motor, each roller having a central shaft to which two link members are pivoted, opposite ends of which are in turn pivoted to said loose head and a filter plate, respectively, to form serpentine link means; diaphragms each having a main portion to be secured to a movable filter plate being made thicker than its periphery to be secured to a stationary filter plate enclosing said movable filter plate and said diaphragm; filter frames supported on a side bar of the filter press and arranged between the filter plates to form filter chambers, the faces of the movable and stationary filter plates being in contact with the respective sides of the filter frame through the filter cloth so as to provide a difference in filtration resistance between the faces of the movable and stationary filter plates, so that when the filter plates are opened the retaining cake of compressed slurry will be attached only to the portion of the filter cloth on the side of high filtration resistance to facilitate removing the cake from the cloth and dropping it out of the filter chamber; and filter cloth transfer means including transfer rollers consisting of first and second sets of rollers arranged above and below said filter plates and filter frames, the diameter of said first rollers above arranged being smaller than that of said second rollers.

6. A filter plate for a filter press according to claim 5, wherein said difference in filtration resistance is obtained by difference in areas of collecting grooves forming filtrate paths through which the filtrate flows and which are formed in the opposed surface faces of said movable and stationary filter plates having interposed therebetween the filter cloth and filter frame.

7. A filter plate for a filter press according to claim 5, wherein said difference in filtration resistance is obtained by providing a perforated plate between the surface face of the the movable filter plate and the adjacent filter cloth.

8. A filter plate for a filter press according to claim 5, wherein said difference in filtration resistance is obtained by providing a perforated plate between the surface face of the stationary filter plate and the adjacent filter cloth.

* * * * *